(12) United States Patent
Burgess et al.

(10) Patent No.: US 10,596,453 B2
(45) Date of Patent: Mar. 24, 2020

(54) CONTROLLER FOR A GAMES CONSOLE, TOOL AND A METHOD THEREFOR

(71) Applicant: Ironburg Inventions Ltd., Wincanton, Somerset (GB)

(72) Inventors: Simon Burgess, Cossington (GB); Duncan Ironmonger, Atlanta, GA (US); Carl S. Jeffrey, Rochester (GB)

(73) Assignee: Ironburg Inventions Limited, Wincanton (GB)

( * ) Notice: Subject to any disclaimer, the term of this patent is extended or adjusted under 35 U.S.C. 154(b) by 142 days.

(21) Appl. No.: 15/116,549

(22) PCT Filed: Feb. 5, 2015

(86) PCT No.: PCT/EP2015/052448
§ 371 (c)(1),
(2) Date: Aug. 4, 2016

(87) PCT Pub. No.: WO2015/118082
PCT Pub. Date: Aug. 13, 2015

(65) Prior Publication Data
US 2016/0346682 A1    Dec. 1, 2016

Related U.S. Application Data

(60) Provisional application No. 61/935,898, filed on Feb. 5, 2014.

(51) Int. Cl.
*A63F 13/24* (2014.01)
*A63F 13/22* (2014.01)
(Continued)

(52) U.S. Cl.
CPC ............. *A63F 13/24* (2014.09); *A63F 13/21* (2014.09); *A63F 13/214* (2014.09); *A63F 13/22* (2014.09); *G06F 3/0227* (2013.01)

(58) Field of Classification Search
CPC .......... A63F 13/21; A63F 13/24; A63F 13/22; A63F 13/214; G06F 3/0227
See application file for complete search history.

(56) References Cited

U.S. PATENT DOCUMENTS 4,032,728 A    6/1977   Oelsch
4,786,768 A    11/1988   Langewis et al.
(Continued)

FOREIGN PATENT DOCUMENTS

CN    202 528 096 U    11/2012
CN    203 077 157 U    7/2013
(Continued)

OTHER PUBLICATIONS

International Search Report, PCT/EP2015/052448 (dated 2015).
(Continued)

*Primary Examiner* — Xuan M Thai
*Assistant Examiner* — Malina D. Blaise
(74) *Attorney, Agent, or Firm* — Walters & Wasylyna LLC

(57) ABSTRACT

A hand held controller for a games console comprising an outer case, a plurality of controls located on a front end and/or top of the controller, at least one additional control located on a back of the controller, a control unit for controlling a mode of operation of the controller and at least one magnetic sensor in communication with the control unit. The control unit is configured to receive a signal from the at least one magnetic sensor in dependence upon a magnetic field being detected by the at least one magnetic sensor and the control unit is configured to determine a mode of operation of the controller in dependence upon the signal received from the at least one magnetic sensor.

30 Claims, 8 Drawing Sheets

(51) Int. Cl.
  *A63F 13/214* (2014.01)
  *A63F 13/21* (2014.01)
  *G06F 3/02* (2006.01)

(56) References Cited

U.S. PATENT DOCUMENTS

| | | | |
|---|---|---|---|
| 5,430,262 | A | 7/1995 | Matsui et al. |
| 5,451,053 | A * | 9/1995 | Garrido ............... A63F 13/06 |
| | | | 463/37 |
| 5,773,769 | A | 6/1998 | Raymond |
| 5,841,372 | A | 11/1998 | Matsumoto |
| 5,874,906 | A | 2/1999 | Willner et al. |
| 5,989,123 | A | 11/1999 | Tosaki et al. |
| 6,203,432 | B1 | 3/2001 | Roberts et al. |
| 6,251,015 | B1 | 6/2001 | Caprai |
| 6,512,511 | B2 * | 1/2003 | Willner ............... A63F 13/06 |
| | | | 345/156 |
| 6,752,719 | B2 * | 6/2004 | Himoto ............... A63F 13/02 |
| | | | 463/37 |
| 6,760,013 | B2 * | 7/2004 | Willner ............. G06F 3/0219 |
| | | | 345/163 |
| 6,853,308 | B1 | 2/2005 | Dustin |
| 7,510,477 | B2 | 3/2009 | Argentar |
| 7,758,424 | B2 * | 7/2010 | Riggs ................. A63F 13/06 |
| | | | 341/20 |
| 7,859,514 | B1 | 12/2010 | Park |
| 8,641,525 | B2 | 2/2014 | Burgess et al. |
| 8,777,620 | B1 | 7/2014 | Baxter |
| 9,089,770 | B2 | 7/2015 | Burgess et al. |
| 9,804,691 | B1 | 10/2017 | Strahle et al. |
| 2001/0003713 | A1 | 6/2001 | Willner et al. |
| 2001/0025778 | A1 | 10/2001 | Ono |
| 2002/0052237 | A1 | 5/2002 | Magill |
| 2002/0128064 | A1 | 9/2002 | Sobota |
| 2003/0067111 | A1 | 4/2003 | Swan |
| 2003/0069077 | A1 * | 4/2003 | Korienek ............. A63J 21/00 |
| | | | 472/57 |
| 2004/0259059 | A1 | 12/2004 | Aoki |
| 2005/0083297 | A1 | 4/2005 | Duncan |
| 2005/0143173 | A1 * | 6/2005 | Barney ............... A63F 13/428 |
| | | | 463/37 |
| 2005/0215321 | A1 | 9/2005 | Hussaini et al. |
| 2005/0230230 | A1 | 10/2005 | Ueshima et al. |
| 2005/0255915 | A1 | 11/2005 | Riggs et al. |
| 2005/0255918 | A1 | 11/2005 | Riggs et al. |
| 2006/0025217 | A1 | 2/2006 | Hussaini et al. |
| 2006/0116204 | A1 | 6/2006 | Chen et al. |
| 2007/0281787 | A1 | 12/2007 | Numata et al. |
| 2008/0261695 | A1 * | 10/2008 | Coe .................... A63F 13/24 |
| | | | 463/37 |
| 2009/0088250 | A1 | 4/2009 | Carlson |
| 2009/0258705 | A1 | 10/2009 | Guinchard |
| 2010/0073283 | A1 | 3/2010 | Enright |
| 2010/0267454 | A1 * | 10/2010 | Navid .................. A63F 13/24 |
| | | | 463/37 |
| 2010/0304865 | A1 | 12/2010 | Picunko |
| 2011/0256930 | A1 | 10/2011 | Jaouen |
| 2011/0281649 | A1 | 11/2011 | Jaouen |
| 2012/0088582 | A1 * | 4/2012 | Wu .................... A63F 13/211 |
| | | | 463/37 |
| 2012/0142418 | A1 | 6/2012 | Muramatsu |
| 2012/0142419 | A1 | 6/2012 | Muramatsu |
| 2012/0260220 | A1 | 10/2012 | Griffin |
| 2012/0299244 | A1 * | 11/2012 | Rice .................... F41J 3/0028 |
| | | | 273/407 |
| 2012/0322553 | A1 | 12/2012 | Burgess et al. |
| 2012/0322555 | A1 | 12/2012 | Burgess et al. |
| 2013/0147610 | A1 | 6/2013 | Grant et al. |
| 2013/0150155 | A1 * | 6/2013 | Barney ................. A63F 13/06 |
| | | | 463/29 |
| 2013/0196770 | A1 * | 8/2013 | Barney ................. A63H 30/04 |
| | | | 463/37 |
| 2014/0274397 | A1 | 9/2014 | Sebastian |
| 2015/0234479 | A1 * | 8/2015 | Schantz ............... A63F 13/24 |
| | | | 463/36 |
| 2015/0238855 | A1 | 8/2015 | Uy et al. |
| 2016/0082349 | A1 | 3/2016 | Burgess et al. |
| 2016/0193529 | A1 | 7/2016 | Burgess et al. |
| 2016/0346682 | A1 | 12/2016 | Burgess et al. |
| 2017/0001107 | A1 | 1/2017 | Burgess et al. |
| 2017/0001108 | A1 | 1/2017 | Burgess et al. |
| 2017/0087456 | A1 | 3/2017 | Burgess et al. |
| 2017/0151494 | A1 | 6/2017 | Ironmonger et al. |
| 2017/0157509 | A1 | 6/2017 | Burgess et al. |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2008/131249 | 10/2008 |
| WO | WO 2012/036710 | 3/2012 |
| WO | WO2014/187923 | 11/2014 |
| WO | WO2015/004261 | 1/2015 |
| WO | WO2015/110553 | 7/2015 |

OTHER PUBLICATIONS

International Search Report, PCT/EP2015/051290 (dated 2015).
International Search Report, PCT/EP2014/075851 (dated 2015).
International Search Report, PCT/EP2014/075861 (dated 2015).
International Search Report, PCT/EP2014/060587 (dated 2014).
International Search Report, PCT/EP2015/058096 (dated 2015).
Written Opinion of the International Searching Authority, PCT/EP2015/058096 (dated 2015).
Burns, "Review: Scuf Xbox 360 Controller," Xboxer360.com (2010).
Combined Search and Examination Report, GB1011078.1 (dated 2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (dated 2015).
Office Action, U.S. Appl. No. 14/736,771 (dated 2015).
Office Action, U.S. Appl. No. 14/805,597 (dated 2015).
Office Action, U.S. Appl. No. 14/805,641 (dated 2015).
Corrected Petition for *Inter Partes* Review of U.S. Pat. No. 9,089,770, Under 37 C.F.R. § 42.100, filed by Valve Corporation, Case IPR2016-00949 (2016).
Corrected Petition for *Inter Partes* Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.

* cited by examiner

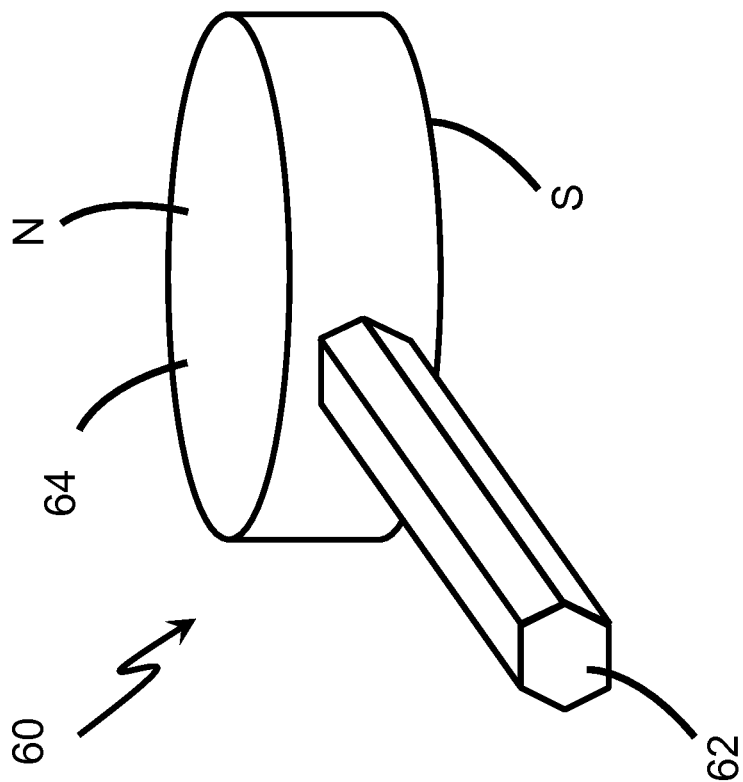
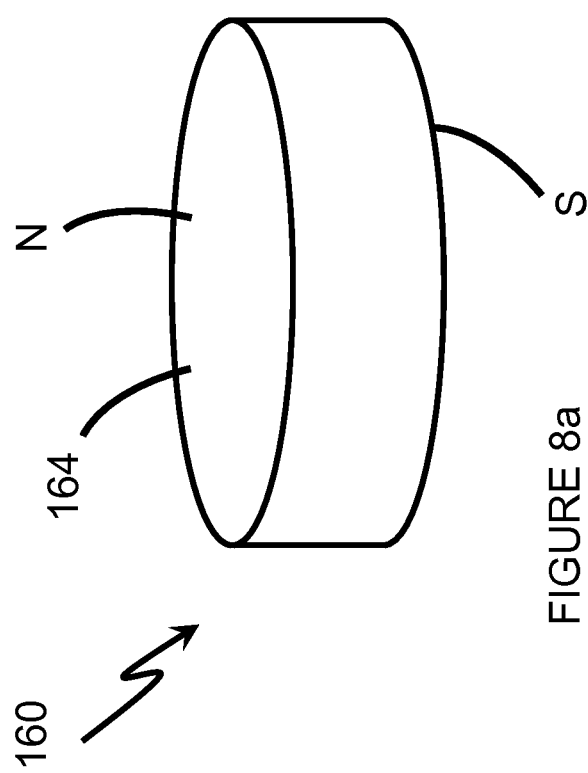

CONTROLLER FOR A GAMES CONSOLE, TOOL AND A METHOD THEREFOR

This application is a U.S. national phase application of Intl. App. No. PCT/EP2015/052448 filed on Feb. 5, 2015, which claims priority from U.S. Ser. No. 61/935,898 filed on Feb. 5, 2014. The entire contents of Intl. App. No. PCT/EP2015/052448 and U.S. Ser. No. 61/935,898 are incorporated herein by reference.

TECHNICAL FIELD

The invention relates to a system and method of controlling the mode of operation of an electronic device such as, but not limited to, controllers for controlling the play of computerised games. More particularly, but not exclusively, the invention relates to a remappable actuator system in a game controller for a gaming console. Aspects of the invention relate to a hand held controller, a tool, an electronic device and a method.

BACKGROUND

There are many different types of gaming consoles currently available for operating a video game. For example Microsoft®, Sony® and Nintendo® manufacture the Xbox®, PlayStation® and Wii® gaming consoles, respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button or actuator which is intended to be operable by the index finger of a user; such buttons are commonly known as triggers. It is known to provide analogue thumb sticks which are intended to be operable by the thumb of a user and to provide additional buttons, typically denoted by alphanumeric symbols or geometric shapes, which are also intended to be operable by the thumb of a user.

Due to the rapidly expanding gaming market and development of involved games invoking considerable player input, it is desirable for players to be able to customise their controllers in order to gain increased control in a variety of gaming circumstances.

Typically, controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers. The controllers have a plurality of actuators or buttons mounted upon an upper surface of the controller and are configured to be operated by a user's thumbs. It is therefore necessary for a user to remove a thumb from one actuator or button in order to operate another actuator or button. This takes time and, in some games, can cause a loss of control. This is a particular problem in games where, for example, a thumb stick is used for aiming but a separate button is used for jumping or crouching.

In light of the above, there is a need for an improved controller which removes the requirement for a user to remove their thumb from the thumb stick in order to operate additional actions controlled by an additional control button.

The present invention seeks to improve upon, or at least mitigate, some of the problems associated with controllers of the prior art by providing a game controller which includes one or more additional actuators mounted to the rear of the controller, the controller having a system to allow the end user to control or recalibrate the functions provided by the additional actuators. The present invention seeks to overcome or at least mitigate the problems of the prior art.

SUMMARY

A first aspect of the present invention provides a hand held controller for a games console comprising:
  an outer case;
  a plurality of controls located on a front end and/or top of the controller;
  at least one additional control located on a back of the controller;
  a control unit for controlling a mode of operation of the controller; and
  at least one magnetic sensor in communication with the control unit;
  the control unit being configured to receive a signal from the at least one magnetic sensor in dependence upon a magnetic field being detected by the at least one magnetic sensor and the control unit being configured to determine a mode of operation of the controller in dependence upon the signal received from the at least one magnetic sensor.

Optionally, the controller is in a first, primary, mode of operation in the absence of a magnetic field being detected by the at least one magnetic sensor.

In some embodiments, the at least one magnetic sensor is a magnetically actuated switch, and the control unit switches the hand held controller between two or more modes of operation in dependence upon the switch being actuated by a magnetic field.

Optionally, the hand held controller comprises a latching device for holding a magnet upon an outer surface of the hand held controller in proximity to the at least one magnetic sensor.

Optionally, the latching device comprises ferromagnetic material.

In some embodiments, in a programmable mode the hand held controller is configurable and wherein the hand held controller enters the programmable mode when the at least one magnetic sensor detects a correctly aligned magnetic field.

In some embodiments, in the programmable mode, functions operated by the at least one additional control located on the back of the controller can be defined.

In some embodiments, in the programmable mode, functions operated by the at least one additional control located on the back of the controller can be assigned to replicate a function operated by one of the plurality of controls located on a front end and/or top of the controller.

In some embodiments, in the programmable mode, functions operated by the at least one additional control located on the back of the controller can be remapped to replicate a function operated by one of the plurality of controls located on a front end and/or top of the controller.

Optionally, in a normal use mode, the hand held controller is locked in a preselected configuration, and wherein the hand held controller enters the normal use mode in the absence of a correctly aligned magnetic field being detected by the at least one magnetic sensor.

In some embodiments, the hand held controller comprises a first magnetic sensor in communication with the control unit and a second magnetic sensor in communication with the control unit, wherein the hand held controller enters a first mode of operation in dependence upon receiving a signal from the first magnetic sensor, and the hand held controller enters a second mode of operation in dependence upon receiving a signal from the second magnetic sensor.

Optionally, the first magnetic sensor is configured and arranged to detect a magnetic field having a first polarity.

Optionally, the second magnetic sensor is configured and arranged to detect a magnetic field having a second polarity, the second polarity opposing the first polarity.

In some embodiments, the second magnetic sensor is configured to detect a magnetic field having a first polarity, the second magnetic sensor being mounted in an opposing orientation to the first magnetic sensor such that the second magnetic sensor is responsive to a magnetic field having a polarity which is opposite to the polarity to which the first magnetic sensor is responsive.

Optionally, in the first mode of operation, the functions operated by the at least one additional control located on a back of the controller can be assigned to replicate the function of one of the plurality of controls located on a front end and top of the controller, and in the second mode of operation one or more of the plurality of controls located on the front end and top of the controller can be biomechanically calibrated to the user.

Optionally, the at least one additional control comprises an elongate member which is inherently resilient and flexible such that it can be displaced by a user to activate a control function.

Optionally, the or each elongate member is at least partially disposed in a respective channel formed in a rear surface of the controller.

In some embodiments, the hand held controller comprises at least one depressible trigger mechanism, and a mechanism for the manual adjustment of a range of motion of the at least one trigger mechanism, the mechanism comprising a keyway for receiving a key.

A second aspect of the present invention provides a tool for use with the hand held controller of the foregoing paragraphs comprising a key for mating with a keyway to adjust a range of motion of a trigger mechanism, the tool further comprising a magnet for triggering the hand held controller to enter a configuration mode of operation when placed proximate to a magnetic sensor mounted to the controller.

A third aspect of the present invention provides a method of configuring a hand held controller for a games console comprising:
 a plurality of controls located on a front end and/or top of the controller;
 at least one additional control located on a back of the controller;
 a control unit; and
 at least one magnetic sensor in communication with the control unit,
 the method comprising:
(i) establishing a magnetic field of appropriate polarity proximate to the at least one magnetic sensor;
(ii) causing the at least one magnetic sensor to issue a signal to the control unit; and
(iii) in dependence upon said signal allowing the hand held controller to enter a programmable mode wherein the hand held controller is configurable.

Optionally, the method further comprises:
(i) actuating a desired one of the at least one additional control; and
(ii) simultaneously or sequentially therewith, activating a desired one of said plurality of controls, to thereby cause the control unit to associate activation of said desired one of the at least one additional control with activation of said desired one of said plurality of controls.

A fourth aspect of the present invention provides an electronic device comprising two or more modes of operation, the electronic device comprising a control unit for controlling the mode of operation and at least one magnetic sensor in communication with the control unit, the control unit being configured to receive a signal from the at least one magnetic sensor in response to a magnetic field being detected by the at least one magnetic sensor and the control unit being configured to determine the mode of operation of the electronic device in dependence upon the signal received from the at least one magnetic sensor.

Optionally, the at least one magnetic sensor is a magnetically actuated switch, and the control unit switches the electronic device between the two or more modes of operation when the magnetically actuated switch is actuated by a magnetic field.

Optionally, the electronic device comprises a latching device for holding a magnet upon an outer surface of the electronic device in proximity to the magnetic sensor.

Optionally, the latching device comprises ferromagnetic material.

In some embodiments, a first of the two or more modes of operation is a programmable mode in which the electronic device is configurable, and wherein the electronic device enters the programmable mode when the at least one magnetic sensor detects a correctly aligned magnetic field.

In some embodiments, a second of the two or more modes of operation is a normal use mode in which the electronic device is locked in a preselected configuration and wherein the electronic device enters the normal use mode in the absence of a correctly aligned magnetic field being detected by the at least one magnetic sensor.

In some embodiments, the electronic device comprises a first magnetic sensor in communication with the control unit and a second magnetic sensor in communication with the control unit, wherein the electronic device enters a first mode of operation upon receiving a signal from the first magnetic sensor, and the electronic device enters a second mode of operation upon receiving a signal from the second magnetic sensor.

Optionally, the first magnetic sensor is configured and arranged to detect a magnetic field having a first polarity.

Optionally, the second magnetic sensor is configured and arranged to detect a magnetic field having a second polarity, the second polarity opposing the first polarity.

In some embodiments, the second magnetic sensor is configured to detect a magnetic field having a first polarity, and the second magnetic sensor is mounted in an opposing orientation to the first magnetic sensor such that the second magnetic sensor is responsive to a magnetic field having a polarity which is opposite to the polarity to which the first magnetic sensor is responsive.

Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 8 is a perspective view of an activation device for use with the controller of FIG. 2; and FIG. 8a is a perspective view of an activation device according to another embodiment for use with the controller of FIG. 2.

DETAILED DESCRIPTION

Detailed descriptions of specific embodiments of the game controller and its actuator mechanisms are disclosed herein. It will be understood that the disclosed embodiments are merely examples of the way in which certain aspects of the invention can be implemented and do not represent an exhaustive list of all of the ways the invention may be embodied. Indeed, it will be understood that the game controller and its actuator mechanisms described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
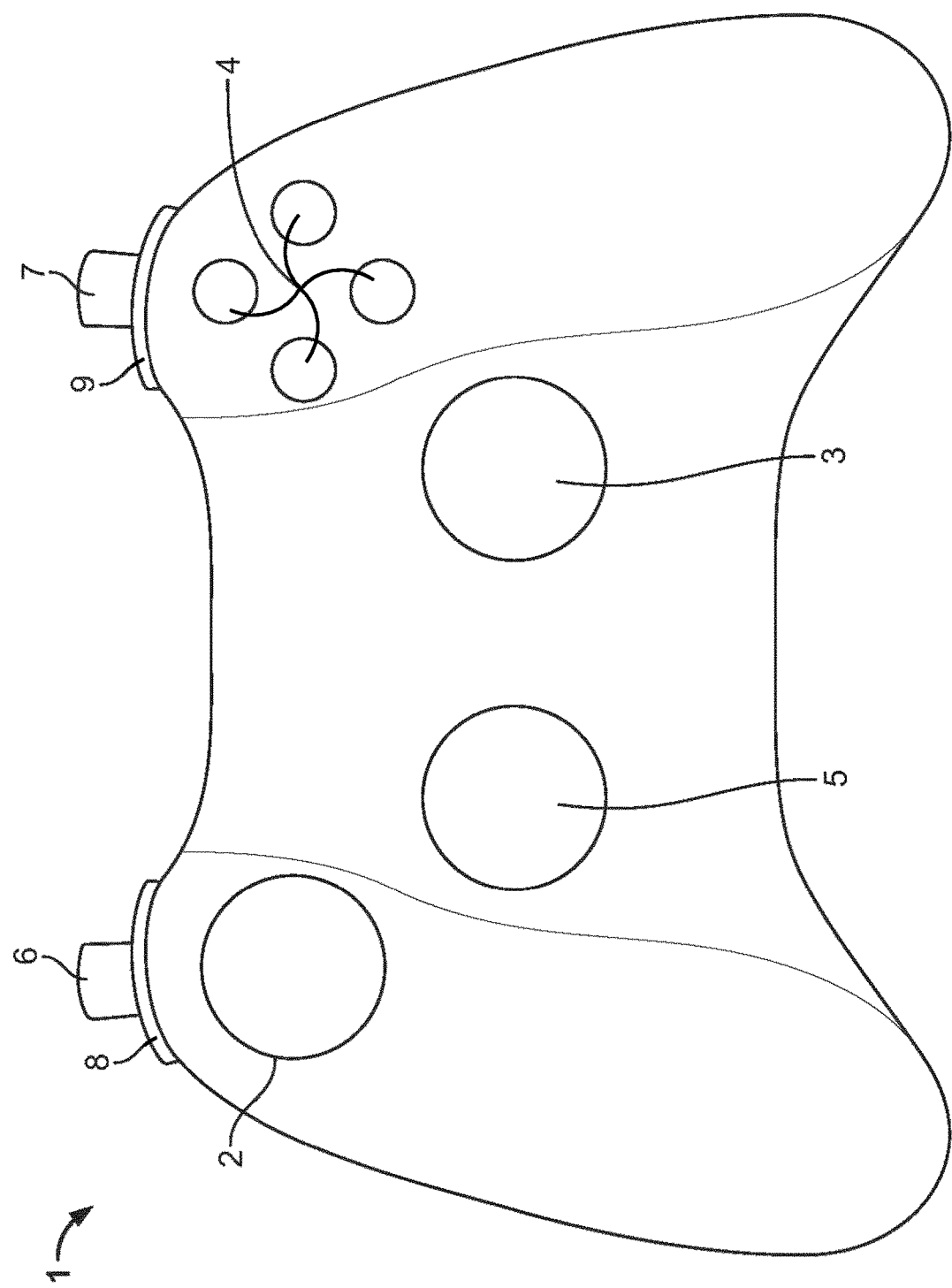
FIG. 1 is a schematic illustration of the front of a conventional games console controller according to the prior art.

Referring to FIG. 1, there is shown a controller 1 according to a first embodiment. The controller 1 comprises an arrangement of controls or actuators that are mounted on the front or top of the controller 1. The controller 1 comprises a left analogue thumb stick 2 and a right analogue thumb stick 3. The left analogue thumb stick 2 and the right analogue thumb stick 3 are normally employed to control movement actions and are intended to be operated by the user's left and right thumbs respectively. The controller 1 comprises four buttons 4, located on a front-right portion of the controller 1, which normally control additional in-game actions and that are intended to be operated by the user's right thumb. The buttons 4 comprise indicia for example, but not limited to, alphanumeric characters, symbols, colours or geometric shapes. The controller 1 comprises a direction pad 5 located on the lower portion of the front-left of the controller 1. The direction pad 5 is intended to be operated by the user's left thumb, and typically is used as either an alternative to the left thumb stick 2 or to provide control or operation of additional actions. The controller 1 also comprises a left trigger body 6, a right trigger body 7, a left bumper 8 and a right bumper 9 located on the front edge of the controller 1. The left and right trigger bodies 6, 7 are typically operated by a user's index or fore fingers. The left and right bumpers 8, 9 may also be operated by a user's index or fore fingers. It will be understood that the arrangement of game controls illustrated in respect of the present embodiment is optional and may vary in other games controllers embodying the present invention, which may be applied to a variety of depressible triggers and actuators as described below.

Figure 2:
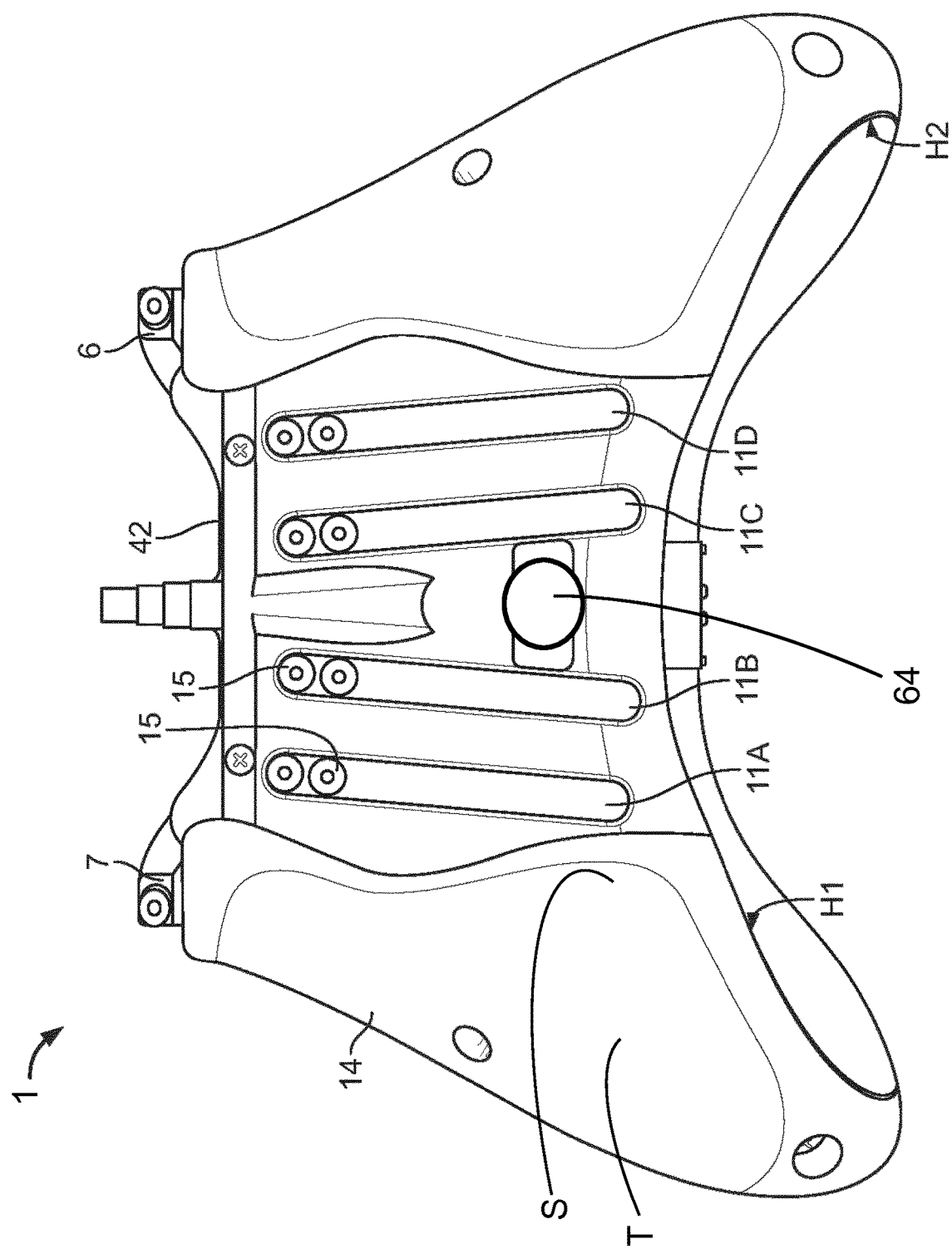
FIG. 2 is a plan view from below of the rear of a games controller according to the first embodiment.
Figure 3:
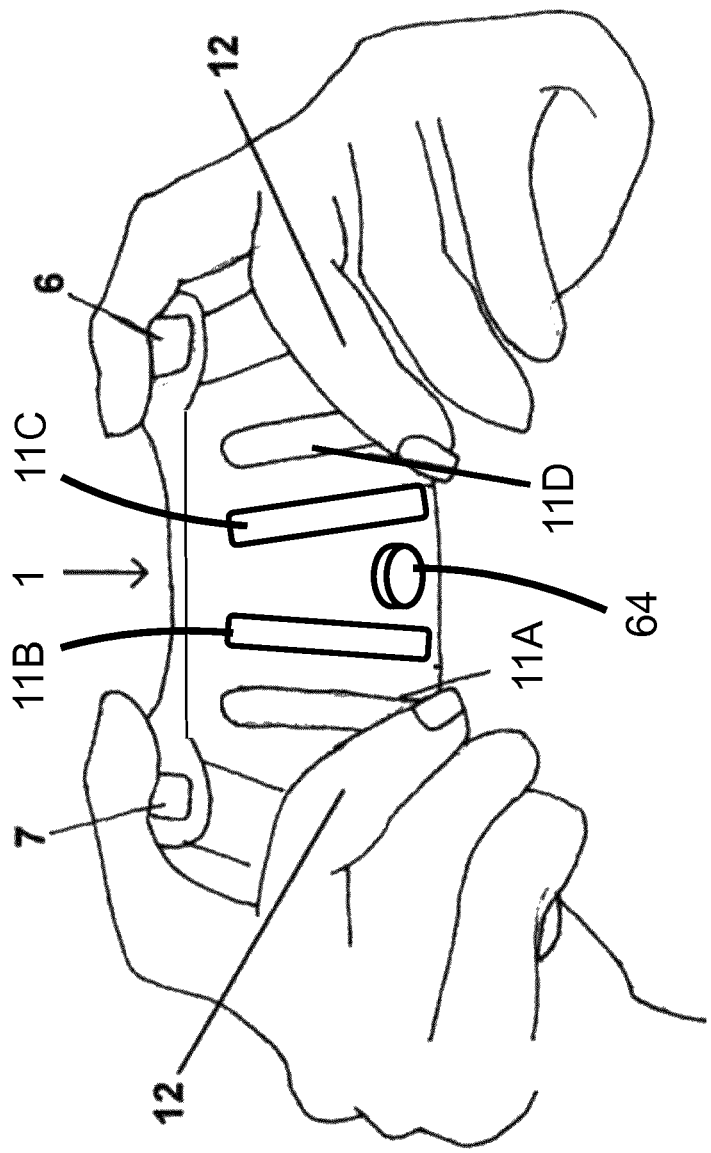
FIG. 3 is a schematic illustration from below of the rear of a games console controller according to the first embodiment in use.

The rear of a games controller 1 according to the first embodiment is illustrated in FIGS. 2 and 3. The games controller 1 additionally comprises four paddle levers 11A, 11B, 11C, 11D (also referred to herein as paddles) located on the rear of the controller 1. The paddles 11A, 11B, 11C, 11D are mounted between a first handle portion H1 and a second handle portion H2 located on the base of the controller 1, and are disposed in close proximity to the outer surface of the controller body. The paddle levers 11A, 11B are substantially orientated in parallel with respect to the first handle portion H1 of the controller 1 and are positioned to be operated by the middle, ring or little fingers of the right hand of a user 12 (as shown in FIG. 3). The paddle levers 11C, 11D are substantially orientated in parallel with respect to the second handle portion H2 of the controller 1 and are positioned to be operated by the middle, ring or little fingers of the left hand of a user 12 (as shown in FIG. 3). In alternative embodiments the games controller 1 may comprise more or less than four paddle levers in particular, but not limited to, two paddle levers. The one or more paddle levers in other embodiments may be orientated in different positions or configurations to that shown; however, the illustrated position and configuration of paddle levers 11A, 11B, 11C, 11D provides a degree of user comfort.

In one embodiment the paddles 11A, 11B, 11C, 11D are formed from a thin, flexible material such as a plastics material, for example polyethylene. Optionally, the paddles 11A, 11B, 11C, 11D are less than 10 mm thick, but may be less than 5 mm thick and optionally are 3 mm thick or less.

The paddles 11A, 11B, 11C, 11D are inherently resilient, that is to say that they return to an unbiased position when not under load. A function switch mechanism 48 is associated with each paddle 11A, 11B, 11C, 11D. Each switch mechanism 48 is mounted within the body of the controller 1 (as shown in FIGS. 4 to 7). A user may displace or depress any of the paddles 11A, 11B, 11C, 11D by engaging an outer surface thereof. Such displacement or depression causes the operated paddles 11A, 11B, 11C, 11D to activate the switch mechanism 48 associated therewith.

In the embodiment of FIG. 2, the paddle levers 11A, 11B, 11C, 11D are each fixedly attached to the controller 1 by a screw mechanism. Each paddle lever 11A, 11B, 11C, 11D comprises a first part of a complementary locking mechanism such as, but not limited to, a barb or catch. The controller body comprises a second part of the complementary locking mechanism for each paddle lever 11A, 11B, 11C, 11D such as, but not limited to, an aperture or recess provided in a conduit configured to receive at least a portion of a paddle lever 11A, 11B, 11C, 11D. A pair of apertures is provided in each paddle lever 11A, 11B, 11C, 11D. A screw 15, having an external screw thread, is received in each aperture of the pair of apertures in each paddle lever 11A, 11B, 11C, 11D. The apertures for receiving the screws are provided at one end of the paddles 11A, 11B, 11C, 11D; this is a fixed end. The other end of the paddles 11A, 11B, 11C, 11D is moveable. In this way, the paddles 11A, 11B, 11C, 11D can be bent or deformed temporarily. The inherent resilience of the paddles 11A, 11B, 11C, 11D returns the paddles 11A, 11B, 11C, 11D substantially to their starting position when released. The screws 15 are received in the base of the controller 1 in a respective aperture having an internal screw thread. It is envisaged that the internal screw thread may be pre-tapped into the base portion of the controller body, or may be created when driving the screws 15 into the base portion of the controller body, for example by using a self-tapping screw. It is also envisaged that the internal screw thread may be provided directly in the material forming the base portion of the controller body or may be provided in a separate insert or nut secured to, or in, the controller body.

In other embodiments other fixing means are envisaged, for example a complementary locking mechanism.

Optionally, the base of the controller 1 is provided with four channels. Each channel receives a respective one of the paddles 11A, 11B, 11C, 11D. In the illustrated embodiment the channels are arranged to receive an end portion of the respective paddle 11A, 11B, 11C, 11D. This is achieved by reducing the depth of the channels towards one end such that the channels are tapered; optionally, the depth is reduced to 0 mm such that the channels terminate. This provides that one end of each of the paddles 11A, 11B, 11C, 11D stands proud of the base of the controller 1. In this way a user can readily engage with the paddles 11A, 11B, 11C, 11D. The channels provide stability to the paddles 11A, 11B, 11C, 11D. This increases the durability of the paddles and of the fixing means therefor.

The channels reduce the likelihood of the paddles 11A, 11B, 11C, 11D rotating about their fixed end when their moveable end is engaged. The channels also serve to restrict movement of the paddles 11A, 11B, 11C, 11D in a direction substantially perpendicular to the base of the controller.

In this way, a user may engage the paddles 11A, 11B, 11C, 11D with the tips of their fingers, optionally their middle fingers, without compromising the user's grip on the controller 1. It is envisaged that a user may use their ring or their little finger to operate a paddle lever 11A, 11B, 11C, 11D. The index fingers may simultaneously engage trigger style controls mounted on the forward end of the controller 1 whilst the thumbs may be used to activate controls on the top of the controller 1. Thus a greater number of controls can be operated simultaneously and/or without the user having to significantly move their hand.

The paddles 11A, 11B, 11C, 11D are elongate in shape and substantially extend in a direction from the front edge towards a rear edge of the controller 1. In one embodiment, the paddles 11A, 11B, 11C, 11D are orientated such that they converge, at least slightly, with respect to one another towards the front edge of the controller 1. In an alternative embodiment, the paddles are orientated in parallel with respect to one another. The elongate shape of the paddles 11A, 11B, 11C, 11D allows a user 12 to engage the paddles 11A, 11B, 11C, 11D with any of the middle, ring or little fingers; it also provides that different users, having different sized hands, can engage with the paddles in a comfortable position. This may be beneficial in reducing the detrimental effects associated with prolonged or repeated use of controllers 1, such as repetitive strain injury.

Each of the four paddle levers 11A, 11B, 11C, 11D can replicate the function of one of the buttons 4 located on the front of the controller 1, and thereby allow a user to operate the functions of the buttons 4 using their middle fingers, without the need to remove either of their thumbs from the left or right thumb stick 2, 3. In alternative embodiments, the paddle levers 11A, 11B, 11C, 11D may activate a new (different) function that is not already activated or controlled by the controls 4, 2, 3, 5, 6, 7, 8, 9 on the top or front edge of the controller 1.

It is envisaged that the paddles 11A, 11B, 11C, 11D could be fitted to an existing controller 1. In such embodiments, the paddles 11A, 11B, 11C, 11D would be mounted on an outer surface of the controller body by means of a mechanical fixing such as a screw or a bolt or, alternatively, bonded or welded to the controller body by adhesive or other suitable means. As described above, a switch mechanism 48 is mounted within the controller in vertical registry with a portion of each paddle 11A, 11B, 11C, 11D. A portion of each switch mechanism 48 may extend through the controller body and may be disposed in close proximity to, or in contact with, or otherwise associated with, an innermost (underside) surface of a paddle 11A, 11B, 11C, 11D.

The handles H1, H2 comprise an inner surface S, as shown in FIG. 2. The inner surface S is engaged by the middle, ring and little fingers of a user's hands, as shown in FIG. 3. The ring and little fingers are increasingly important for grip of the controller 1 when the middle fingers are employed to actuate the paddles 11A, 11B, 11C, 11D. The inner surface S of each of the handles H1, H2 meets a region of the base of the controller 1 upon which the paddles 11A, 11B, 11C, 11D are mounted. The inner surface S is inclined at a steep angle with respect to this region of the controller 1. This angle is equal to or greater than 45 degrees; optionally it may be between about 50 degrees and about 60 degrees. The handles H1, H2 have a substantially flat top portion T. The flat portion T meets the inner surface S to define a corner or edge; the corner or edge is sharp, that is to say it has a small radius of curvature. In this way, the handles H1, H2 optionally provide an ergonomic shape for being grasped by the ring and little fingers of a user's hands.

Figure 4:
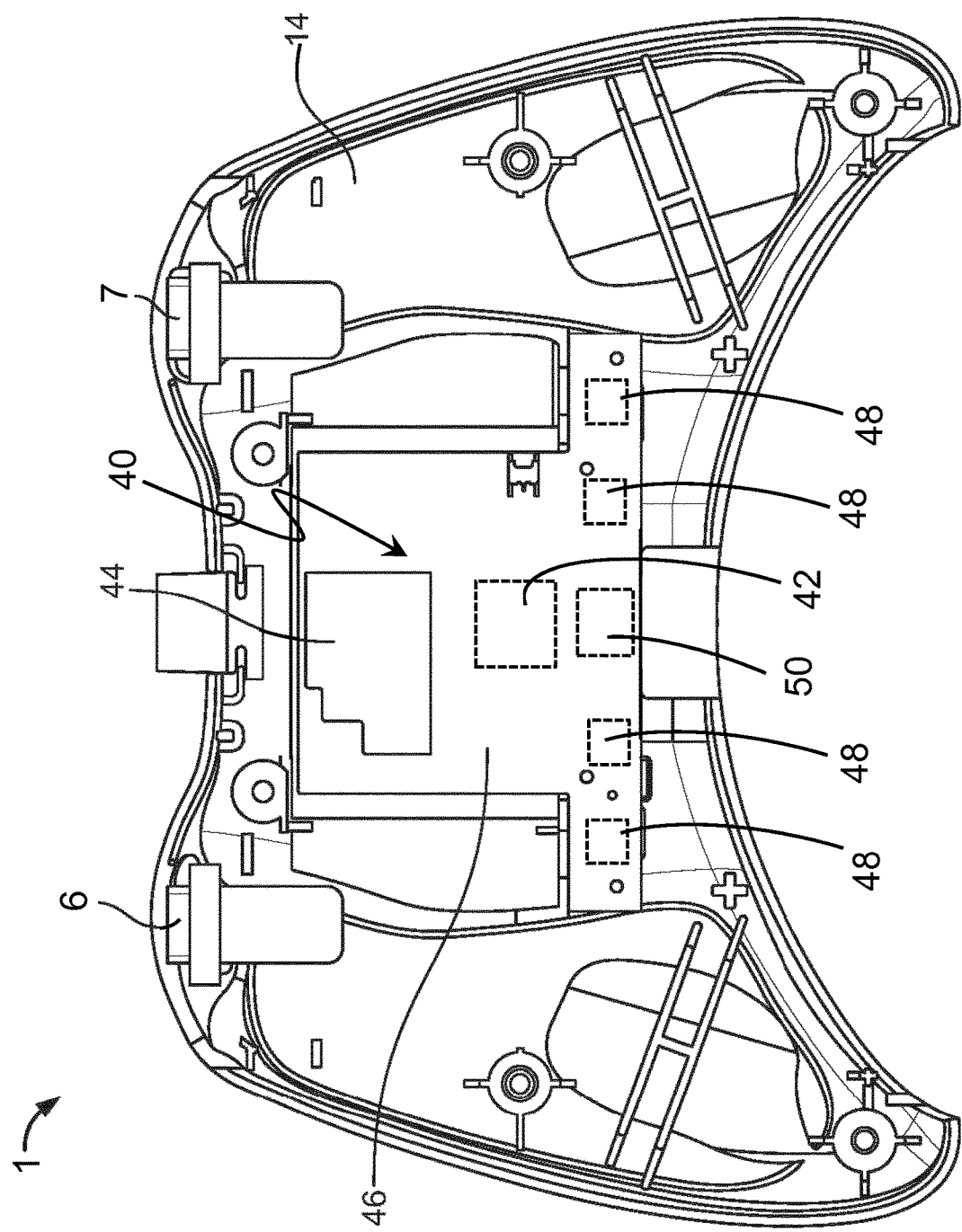
FIG. 4 is a plan view of an internal surface of a rear panel of a games console controller showing a control circuit board according to the first embodiment.
Figure 5:
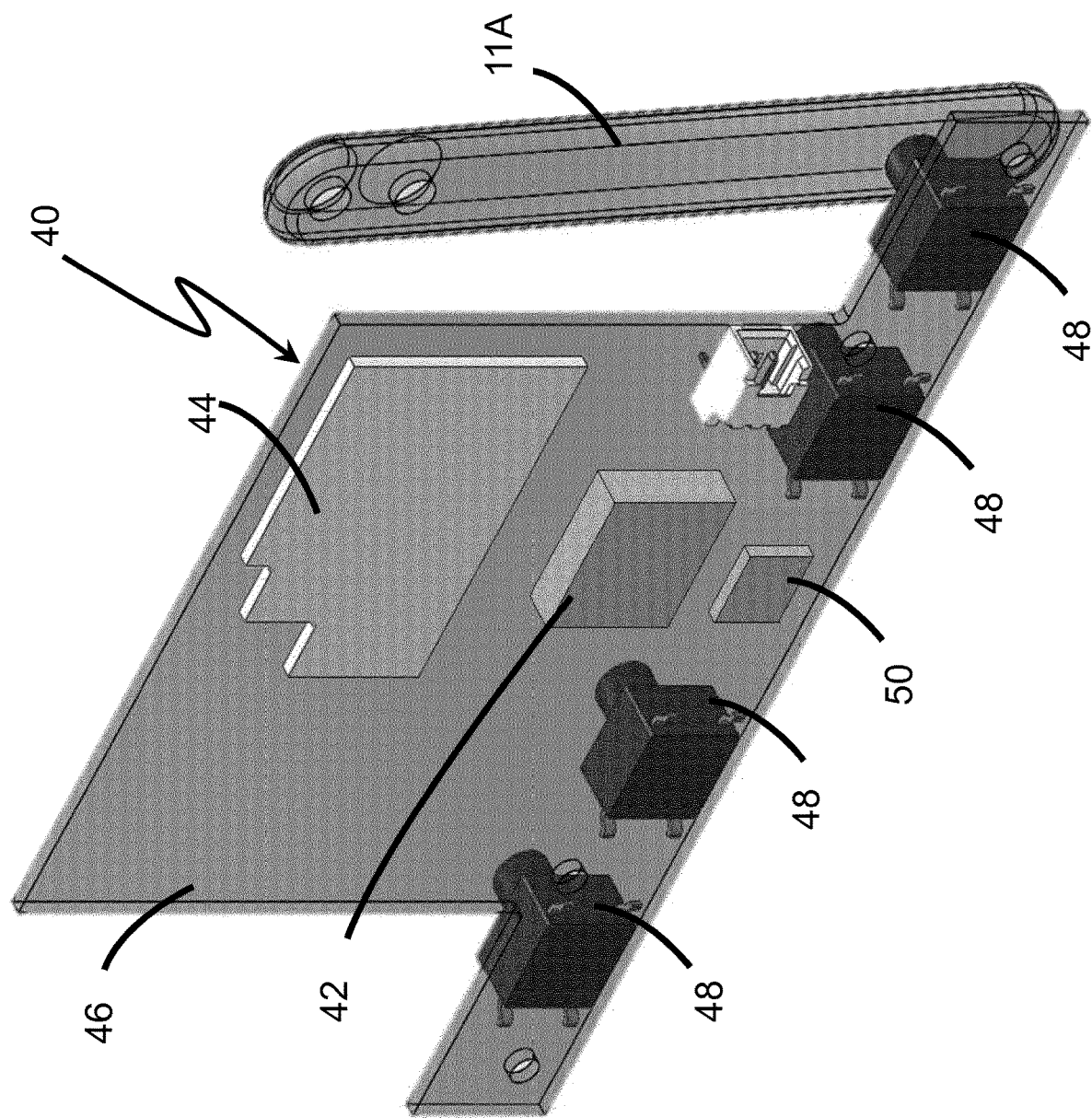
FIGS. 5 and 6 are perspective views from below of the control circuit board according to the first embodiment.
Figure 6:
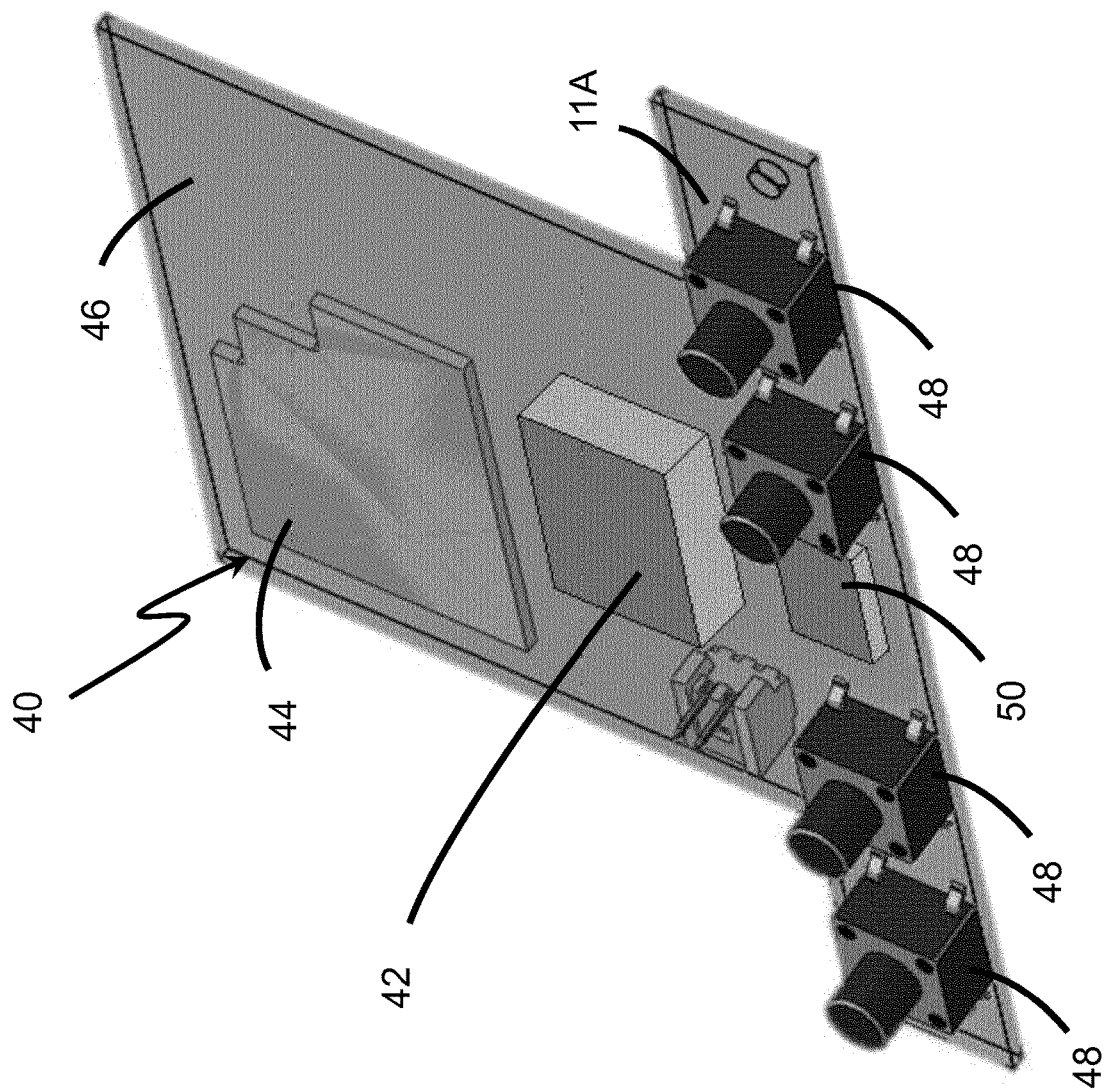
Figure 7:
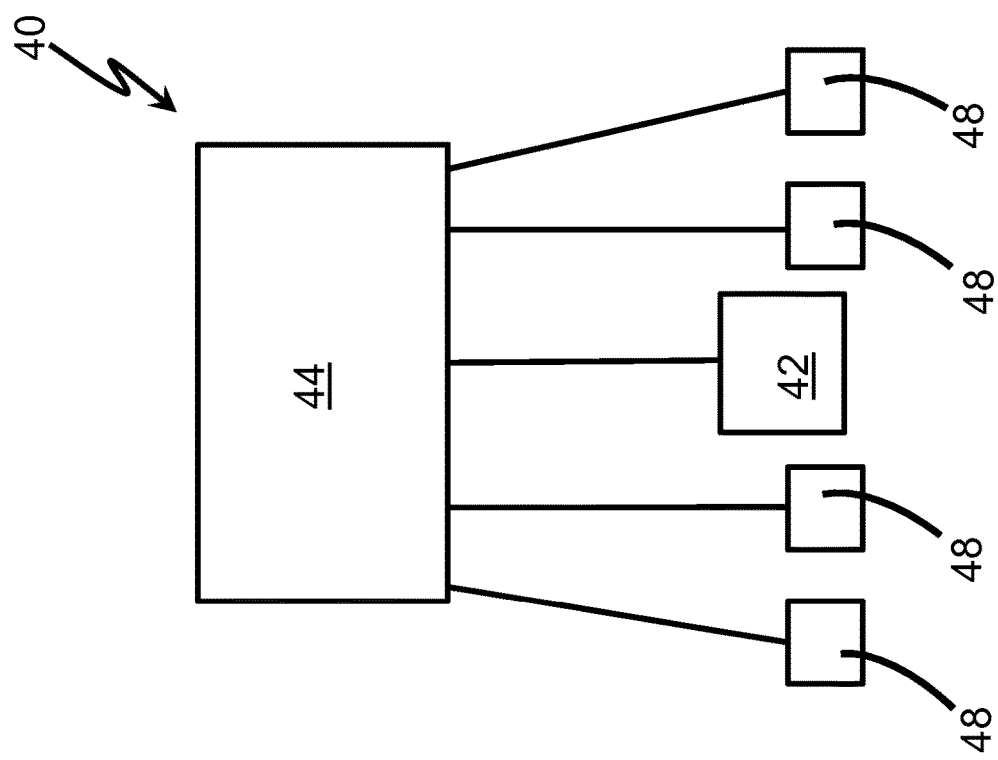
FIG. 7 is a schematic illustration of a control circuit board.

FIG. 4 shows an internal view of a back panel 14 for the games controller 1. The rear panel 14 comprises a remap system 40, which optionally in this embodiment comprises a board 46, which may be a printed circuit board (PCB) or other suitable electronic circuit board 46 to which other components of the remap system 40 may be mounted to and/or by which components of the remap system 40 may be electrically copied. The remap system 40 is best shown in FIGS. 5 to 7 and as shown, also includes a remap initiation device 50. The remap initiation device 50 optionally, in this arrangement, takes the form of a magnetic sensor such as, but not limited to, a Hall sensor (also referred to herein as a Hall-effect sensor) or a reed switch. The remap initiation device 50 is provided for activating the remap system 40. The electronic circuit board 46 also houses or includes one or more function switches 48 each having a switch mechanism 48. Optionally each of the switch mechanisms 48 replicates a function of one of the buttons 4 that are located on the front of the controller 1.

The remap system 40 also comprises a control unit 44, optionally in the form of a microprocessor. The control unit 44 is in communication with each of the function switches 48; optionally it is electrically coupled to each of the function switches 48. The control unit 44 is in communication with a main processing unit (not shown) of the controller 1. The control unit 44 is capable of receiving signals from each of the function switches 48 and is capable of transmitting those or similar signals to the main processing unit. The control unit 44 is programmed to interpret which of the function switches 48 has been activated by a user 12 (by depressing the appropriate paddle 11A, 11B, 11C, 11D associated therewith). The control unit 44 stores, in a memory device, the identity of the respective one of the buttons 4 or other controls 2, 3, 5, 6, 7, 8, 9 located on the front of the controller 1 that each of the function switches 48 is mapped to. That is to say, the control unit 44 can remember or recall which one of the buttons 4 or other controls 2, 3, 5, 6, 7, 8, 9 on the front of the controller 1 each function switch 48 replicates or corresponds to. When a function switch 48 is operated, the control unit 44 relays a signal to the main processing unit to indicate that the control button 4 mapped thereby has effectively been activated. In some embodiments, the control unit 44 may be integrated within the main processing unit. In some embodiments, the control unit 44 passes the signal received from the function switches 48 over to the main processing unit (not shown). In other embodiments, the control unit 44 may adjust or convert the signal received from one of the function switches 48 into a different format to that format in which the signal was received, for example, in order that the main processing unit can correctly read or interpret signals received from the control unit 44. The remap system 40 comprises a latching device 42 disposed proximate to the remap initiation device 50. The latching device 42 is formed from a magnetisable material; optionally the latching device 42 comprises a ferromagnetic material such as iron, nickel or cobalt. Optionally, the latching device 42 is secured to the board 46 (also referred to herein as "chassis" 46) to which the control unit 44, function switches 48 and remap initiation device 50 are mounted.

In alternative embodiments the latching device 42 may be secured to the back panel 14 or to a chassis member (not shown) forming part of the controller 1. In such embodiments the latching device 42 is disposed in sufficient proximity to the remap initiation device 50 such that when a permanent magnet is placed proximate to the latching device 42 the magnetic field is detected by the remap initiation device 50.

The remap initiation device 50 is optionally configured to operate as a magnetically activated switch. When a key 64 in the form of a magnet 64, optionally a permanent magnet 64, is placed sufficiently close to or against the outer surface of the back panel 14 as shown in FIGS. 2 and 3, the controller 1 enters a remapping mode. In the remapping mode the control unit 44 can be reprogrammed, and each of the function switches 48 is assigned (or re-assigned) to replicate a desired one of the controls 4, 2, 3, 5 located upon the front of the controller 1. With the magnet 64 latched or held in place upon the back of the controller 1 (by virtue of the force of magnetic attraction between the key 64 and the latching device 42) the user 12 can assign a given one of the paddle levers 11A, 11B, 11C, 11D to a given one of the controls, optionally one of the buttons 4 located upon the front of the controller 1. In this way the controller 1 can be optimised for control of a specific software application such as a game or simulation by a user 12 and according to the user's preferred requirements.

When a magnet 64 is placed against a predefined region of the outer surface of the controller body or case, the magnet 64 is secured or latched onto the controller 1 due to the force of magnetic attraction between the magnet 64 and the latching device 42. This has the effect of placing the remap initiation device 50 (which is a magnetic sensor) in a magnetic field. The remap initiation device 50 (magnetic sensor 50) detects the magnetic field. When the remap initiation device 50 is a Hall sensor, the magnetic field affects the output voltage of the Hall sensor. Optionally, the Hall sensor comprises an electronic circuit so that it operates in digital (on/off) fashion behaving functionally as a switch. The Hall sensor may be unipolar, often referred to as a "unipolar switch", and is operated by a positive magnetic field. A single magnet presenting a south polarity (positive) magnetic field of sufficient strength (magnetic flux density) will cause the remap initiation device 50 to switch to its "on" state. After it has been turned on, the remap initiation device 50 (Hall sensor) will remain in the "on" state until the magnetic field is removed. Upon removal of the magnetic field (by removing key 64 away from latch 62) the remap initiation device 50 (the Hall sensor) reverts to its "off" state. It will be appreciated that in some embodiments where the remap initiation device 50 is a unipolar Hall sensor, the remap initiation device 50 may be operated by a negative magnetic field when brought into sufficient proximity with a magnet presenting a north polarity (negative) magnetic field of sufficient strength (magnetic flux density).

In some embodiments the remap initiation device 50 (magnetic sensor) may be an omnipolar Hall-effect sensor, often referred to as an "omnipolar switch". Omnipolar Hall-effect sensors operate when brought into proximity with either a strong positive (south pole) or strong negative (north pole) magnetic field. A single magnet presenting a magnetic field of sufficient strength (magnetic flux density) will cause the remap initiation device 50 to switch to its "on" state. After it has been turned on, the omnipolar Hall-effect sensor will remain in the "on" state until the magnetic field is removed, upon which the Hall sensor reverts to its "off" state.

In some embodiments the remap initiation device 50 comprises a reed switch, which comprises a pair of contacts on ferrous metal reeds. The pair of contacts may be either: normally open, closing when a magnetic field is present; or normally closed, opening when a magnetic field is present. The reed switch may be opened or closed by bringing the magnet near to the reed switch. Once the magnet is pulled away from the reed switch, the reed switch reverts to its original starting position.

The paddle levers 11A, 11B, 11C, 11D when pressed by the user 12 engage with a respective one of the function switches 48, as illustrated in FIG. 5, to activate the respective function which has been programmed to correspond to that switch.

FIG. 8 illustrates a tool 60. The tool 60 comprises a permanent magnet 64 having two poles, a north pole N and a south pole S. The tool 60 also comprises a key 62 in the form of a hexagonal wrench, also referred to as a 'hex' or allen key, so as to mate with a keyway in the form of a hexagonal socket disposed with the control screw 15 of the trigger adjustment apparatus described above and/or as described in the incorporated U.S. Pat. No. 8,480,491, U.S. 61/910,260 and U.S. 61/930,065. In alternative embodiments the key 62 may take different forms so as to mate with an alternative form of screw drive such as, but not limited to, a Slot ('flat'), Cross, Phillips, Pozidriv (SupaDriv), Square, Robertson (square socket), Hex, Security hex socket (pin-in-hex-socket), Line (game bit), Torx, Security Torx, Tri-Wing, Torq-set, Spanner head, ('Snake-eye'), Triple square, Polydrive, Spline drive, Double hex, Bristol, Pentalobular, TA (triangle-shaped recessor socket), TP3 (Reuleaux Triangle-shaped recess or socket), or Tri-point. In this way the key 62 can be employed to adjust the range of motion of an actuator such as a trigger button and can be employed to control the operational mode of the controller 1. It will be appreciated that keys having alternative shapes may be used. The control screw comprises a complementary shaped keyway or keyseat so as to mate with the key 62. The permanent magnet 64 and physical key 62 are optionally affixed directly to one another or integrally formed with one another. Optionally, the tool 60 in particular the permanent magnet 64 portion may be coated or moulded or otherwise housed in a protective layer such as a plastic material.

FIG. 8a illustrates a tool 160 according to another embodiment. The tool 160 comprises a permanent magnet 164 having two poles, a north pole N and a south pole S. The key 62 has been omitted from the tool 160; the key 62 may be provided as separate tool (not shown). Optionally, the tool 160 may be coated or moulded or otherwise housed in a protective layer such as a plastic material.

The remap system 40 can be activated or programmed by a user 12 whist the controller 1 is in use, for example during game play. The controller 1 can be placed in the remapping mode such that the control unit 44 can be reconfigured or reprogrammed by placing the tool 60 (see FIGS. 2, 3 and 8) against the back of the controller 1. The tool 60 is held (latched) in position by magnetic attraction between the permanent magnet 64 and the latching device 42. The controller 1 remains in the remapping mode while the tool 60 is latched to the controller 1. The control unit 44 can be reprogrammed when in the remapping mode for example, but not limited to, by simultaneously actuating (pressing), for a predefined time period, a desired one of the paddles 11A, 11B, 11C, 11D (hence activating the respective function switch 48), and actuating (pressing) a desired one of the buttons 4 (the function of which the paddle 11A, 11B, 11C, 11D is to replicate) whilst the tool 60 is held against the rear of the controller 1. The control unit 44 stores in a memory location the identity of the actuated paddle lever 11A, 11B, 11C, 11D and the identity of the actuated button 4 (the control function of which is to be replicated by the desired paddle 11A, 11B, 11C, 11D). Upon release of the desired paddle 11A, 11B, 11C, 11D, and the desired button 4, the remap system 40 will have configured the selected paddle 11A, 11B, 11C, 11D to replicate the function of the selected button 4. Alternatively, the control unit 44 is reprogrammed whilst the controller 1 is in the remap mode by pressing a desired one of the paddle levers 11A, 11B, 11C, 11D (to activate the respective function switch 48) and then sequentially activating the desired one of the control buttons 4.

Removal of the tool 60 from the rear of the controller 1 then terminates or causes the controller 1 to exit the remapping mode, effectively "locking" each paddle lever 11A, 11B, 11C, 11D to each user selected button 4. This is advantageous because the function of any paddle 11A, 11B, 11C, 11D can be changed, by the user, in game play and provides an instant remapping function. The remapping function can be used repeatedly by a user 12 who can thereby reconfigure their controller in accordance with the game they are playing and in dependence upon their preference.

In some embodiments the controller 1 additionally comprises a trigger adjustment apparatus (not shown) that has a mechanism to allow the end user 12 to control or recalibrate the range of motion of the trigger body 6, 7 of the left or right trigger mechanism. U.S. Pat. No. 8,480,491, U.S. 61/910,260 and U.S. 61/930,065 each disclose a trigger adjustment apparatus; the contents of these disclosures are incorporated herein in their entirety.

The trigger adjustment apparatus comprises a body in which a bore or aperture is defined. In some embodiments at least a portion of the body is configured to be received between a chassis member of the controller and the left or right trigger body.

Optionally, the bore comprises an internal screw thread for receiving a control screw. The control screw is also referred to herein as a trigger adjustment control screw. In some embodiments, the control screw takes the form of a grub screw having a hexagonal socket style drive; in other embodiments the control screw comprises a head preventing the entire control screw from passing through the body. In other embodiments the control screw may comprise other means for mechanically locating it within the aperture at a selected location and, as such, the internal form of the bore and/or the control screw may have forms other than a conventional screw-type format.

The trigger body comprises a strike plate against which the control screw can be brought to bear. The position of the trigger body relative to the outer case or chassis of the controller can be adjusted by rotation of the control screw. The trigger adjustment apparatus may comprise a control screw to adjust a first end stop position of the trigger body and a second control screw to adjust a second end stop position of the trigger body. In alternative embodiments the second end stop position of the trigger body may be provided by a portion or face of the body or the trigger adjustment apparatus.

In some embodiments, the controller 1 may enter a different mode of operation depending upon which pole of the magnet, north or south, is disposed adjacent to the magnetic sensor. For example, the controller 1 may enter a remapping mode when the north pole is placed against the outer surface of the back panel, whereas the controller 1 may enter a biomechanical adjustment mode for adjusting the alignment of the left and right analogue thumb sticks 2, 3 when the south pole is placed against the outer surface of the back panel. In this way two entirely different modes of operation of the controller 1 can be initiated depending upon which pole of the magnet is placed against the back panel. The remap initiation device 50 (magnetic sensor 50) may be able to discern or detect the orientation of the magnet 64 and hence the orientation or direction of the magnetic field.

In some embodiments the remap system 40 of the controller 1 comprises a remap initiation device 50 having two magnetic sensors which are responsive to magnetic fields of opposite polarities; for example, a first Hall sensor which is activated by a positive magnetic field (south pole) and a second Hall sensor which is activated by a negative magnetic field (north pole).

A first magnetic sensor is employed to initiate a first operation mode of the controller 1. When the first magnetic sensor detects a correctly aligned magnetic field the control unit initiates, or causes the controller 1 to enter, a first mode of operation, for example a remapping mode. For example, the first sensor may be activated by a south polarity (positive) magnetic field of sufficient strength (magnetic flux density). When the first magnetic sensor detects a south polarity (positive) magnetic field the controller 1 enters the first mode of operation.

A second magnetic sensor is employed to initiate a second operation mode of the controller 1. When the second magnetic sensor detects a correctly aligned magnetic field the control unit initiates, or causes the controller 1 to enter, a second mode of operation, for example a recalibration mode such as, but not limited to, a biomechanical recalibration mode as described in U.S. 61/910,168 the contents of which are incorporated herein in their entirety. For example, the second sensor may be activated by a north polarity (negative) magnetic field of sufficient strength (magnetic flux density). When the second magnetic sensor detects a north polarity (negative) magnetic field the controller 1 enters the second mode of operation.

Only one of the first and second sensors will be activated when a magnet is held against the back of the controller 1. Depending upon the orientation of the magnet when placed against the back of the controller 1, the controller 1 will enter either the first or second mode of operation.

In alternative embodiments, the first and second sensors are responsive to magnetic fields of the same polarity. The first and second sensors are activated by a magnetic field of sufficient strength (magnetic flux density) of the same polarity (positive or negative). The first and second sensors are mounted on opposing sides of a circuit board or chassis 46 in opposite orientations (or alternatively in opposing orientations on the same side of a circuit board). That is to say, one sensor is inverted with respect to the other such that one, but only one, of the magnetic sensors will be activated in the presence of a magnetic field, which of the first or second sensors is activated is dependent upon the orientation of the magnet. For example, a first Hall sensor which is activated by, or responsive to, a positive magnetic field (south pole) and a second Hall sensor which is activated by, or responsive to, a positive magnetic field (south pole), or alternatively a first Hall sensor which is activated by, or is responsive to, a negative magnetic field (north pole) and a second Hall sensor which is activated by, or responsive to a negative magnetic field (north pole). In this way the first sensor is activated by a magnetic field having a first polarity (positive or negative) and the second sensor is activated or switched by a magnetic field having a second opposing polarity (negative or positive). The control unit will determine the mode of operation of the controller based upon which one of the pair of magnetic sensors detects a suitably aligned (polarity) magnetic field.

In still further embodiments yet further modes of operation may be entered by monitoring the time period during which the key is held against the back panel. For example holding the key against the back panel for three seconds may initiate a different mode of operation compared to the mode of operation entered if the key is held against the back panel for six seconds. In this way a large number of different modes may be controlled by the magnet dependent upon the polarity and time period. In still further embodiments, the control unit may be configured to respond differently if the key is repeatedly held against and removed from the back panel on two or more occasions. The number of occasions may determine the specific mode entered.

In some embodiments, the function switches 48 take the form of microswitches; in other embodiments the function switches 48 may take the form of a magnetic switch or magnetic sensor, for example a Hall sensor or reed switch. The paddles may each comprise a magnet arranged so as to activate the magnetic switch or sensor when a paddle is depressed by a user. It is envisaged that in such embodiments the magnetic switch or sensor is mounted inside the controller behind the back panel and that there will be no requirement to provide apertures through the back panel in order that the paddles can physically contact the microswitches. Further it is envisaged that the user may be provided with feedback to indicate that the switch has been activated. The feedback may be aural or haptic, for example, such as an audible click. In addition, it is envisaged that paddle lever sensors may be arranged to be activated by a specific pole of the permanent magnet, either north or south. The remap initiation device 50 may be configured to enter the remapping mode by the presence of an opposing pole to that which activates the paddle lever sensor. Alternatively, the paddle lever sensors and the remap sensor may be located upon the rear of the controller at a distal location from one another such that the presence of the paddle lever magnets does not interfere with the remap initiation device and conversely the presence of the key does not interfere with the paddle lever sensors.

It is envisaged that the controllers may be coupled to a games console or computer by a wired connection or by a wireless connection device.

The disclosure may find application outside of game controllers, and may be employed to control the mode of operation of other electronic devices.

It will be recognized that as used herein, directional references such as "top", "bottom", "front", "back", "end", "side", "inner", "outer", "upper" and "lower" do not necessarily limit the respective features to such orientation, but merely serve to distinguish these features from one another. While particular embodiments of the invention have been shown and described, numerous variations and alternate embodiments will occur to those skilled in the art without departing from the scope of the present invention.

The invention claimed is:

1. A hand held controller for a games console comprising:
   an outer case;
   a plurality of controls located on a front end and/or top of the controller;
   at least one additional control located on a back of the controller;
   a control unit for controlling a mode of operation of the controller; and
   at least one magnetic sensor in communication with the control unit; and wherein:
   the control unit is configured to receive a signal from the at least one magnetic sensor in dependence upon a magnetic field being detected by the at least one magnetic sensor;
   the control unit is configured to enter a programmable mode of operation of the controller, in which a function operated by the at least one additional control is selectively remappable to replicate a function operated by a selected one of the plurality of controls located on the front end and/or top of the controller such that the at least one additional control and the selected one of the plurality of controls located on the front end and/or top of the controller are operable to perform the same function, in dependence upon the signal received from the at least one magnetic sensor.

2. The hand held controller according to claim 1 wherein the control unit is configured to enter a normal use mode of operation, in which the function of the at least one additional control is locked, in the absence of a magnetic field being detected by the at least one magnetic sensor.

3. The hand held controller according to claim 1 wherein the at least one magnetic sensor is a magnetically actuated switch, and the control unit switches the hand held controller between two or more modes of operation in dependence upon the switch being actuated by a magnetic field.

4. The hand held controller according to claim 1 comprising a latching device for holding a magnet upon an outer surface of the hand held controller in proximity to the at least one magnetic sensor.

5. The hand held controller according to claim 4 wherein the latching device comprises ferromagnetic material.

6. The hand held controller according to claim 1 wherein the hand held controller enters the programmable mode when the at least one magnetic sensor detects a correctly aligned magnetic field.

7. The hand held controller according to claim 2 wherein the hand held controller enters the normal use mode in the absence of a correctly aligned magnetic field being detected by the at least one magnetic sensor.

8. The hand held controller according to claim 1 wherein the control unit is configured to enter a subsequent programmable mode of operation of the controller, in which the function operated by the at least one additional control located on the back of the controller is selectively reassignable to replicate a function operated by a different selected one of the plurality of controls located on the front end and/or top of the controller such that the at least one additional control and the different selected one of the plurality of controls located on the front end and/or top of the controller are operable to perform the same function, in dependence upon a subsequent signal received from the at least one magnetic sensor.

9. The hand held controller according to claim 2 wherein, in the normal use mode, the functions operated by the plurality of controls located on the front end and/or top of the controller are locked in a predefined configuration and the function operated by the at least one additional control located on the back of the controller is locked in the remapped configuration.

10. The hand held controller according to claim 1 comprising a first magnetic sensor in communication with the control unit and a second magnetic sensor in communication with the control unit, and wherein:
the control unit is configured to enter a second programmable mode, in which functions of the plurality of controls located on the front end and/or top of the controller are definable;
the hand held controller enters the programmable mode of operation in dependence upon receiving a signal from the first magnetic sensor; and
the hand held controller enters the second programmable mode of operation in dependence upon receiving a signal from the second magnetic sensor.

11. The hand held controller according to claim 10 wherein the first magnetic sensor is configured and arranged to detect a magnetic field having a first polarity.

12. The hand held controller according to claim 11 wherein the second magnetic sensor is configured and arranged to detect a magnetic field having a second polarity, the second polarity opposing the first polarity.

13. The hand held controller according to claim 10 wherein the second magnetic sensor is configured to detect a magnetic field having a first polarity, the second magnetic sensor being mounted in an opposing orientation to the first magnetic sensor such that the second magnetic sensor is responsive to a magnetic field having a polarity which is opposite to the polarity to which the first magnetic sensor is responsive.

14. The hand held controller according to claim 10 wherein, in the second programmable mode of operation, one or more of the plurality of controls located on the front end and/or top of the controller are reprogrammable to be biomechanically calibrated to a user.

15. The hand held controller according to claim 1 wherein the at least one additional control comprises an elongate member which is inherently resilient and flexible such that the elongate member is displaceable by a user to activate the function of the at least one additional control.

16. The hand held controller according to claim 15 wherein the elongate member is at least partially disposed in a respective channel formed in a rear surface of the controller.

17. The hand held controller according to claim 1 comprising at least one depressible trigger mechanism, and a mechanism for manual adjustment of a range of motion of the at least one trigger mechanism, the mechanism comprising a keyway for receiving a key.

18. A tool for use with the hand held controller of claim 17 comprising the key for mating with the keyway to adjust the range of motion of the trigger mechanism, the tool further comprising a magnet for triggering the control unit to enter the programmable mode of operation when placed proximate to the magnetic sensor mounted to the hand held controller.

19. A method of configuring a hand held controller for a games console comprising:
a plurality of controls located on a front end and/or top of the controller;
at least one additional control located on a back of the controller;
a control unit; and
at least one magnetic sensor in communication with the control unit,
the method comprising:
(i) establishing a magnetic field of appropriate polarity proximate to the at least one magnetic sensor;
(ii) causing the at least one magnetic sensor to issue a signal to the control unit; and
(iii) in dependence upon the signal, the hand held controller entering a programmable mode of operation, in which a function operated by the at least one additional control is selectively remappable to replicate a function operated by a selected one of the plurality of controls located on the front end and/or top of the controller such that the at least one additional control and the selected one of the plurality of controls located on the front end and/or top of the controller are operable to perform the same function.

20. The method according to claim 19 further comprising, in the programmable mode of operation:
(i) actuating the at least one additional control; and
(ii) simultaneously or sequentially therewith, activating the selected one of the plurality of controls located on a front end and/or top of the controller, to thereby cause the control unit to associate activation of the at least one additional control with activation of the selected one of said plurality of controls.

21. An electronic device comprising two or more modes of operation, the electronic device further comprising:
a plurality of controls;
a control unit for controlling which of the two or more modes of operation of the electronic device is selected; and
at least one magnetic sensor in communication with the control unit; and wherein:
the control unit is configured to receive a signal from the at least one magnetic sensor in response to a magnetic field being detected by the at least one magnetic sensor; and
the control unit is configured to select one of the two or more modes of operation of the electronic device, wherein one of the two or more modes of operation is a programmable mode, in which a function operated by one of the plurality of controls disposed at a first location is selectively remappable to replicate a function operated by a different one of the plurality of controls disposed at a second location such that the one of the plurality of controls disposed at a first location and the different one of the plurality of controls disposed at a second location are operable to perform the same function, in dependence upon the signal received from the at least one magnetic sensor.

22. The electronic device according to claim 21 wherein the at least one magnetic sensor is a magnetically actuated switch, and the control unit switches the electronic device between the two or more modes of operation when the magnetically actuated switch is actuated by a magnetic field.

23. The electronic device according to claim 21 comprising a latching device for holding a magnet upon an outer surface of the electronic device in proximity to the magnetic sensor.

24. The electronic device according to claim 23 wherein the latching device comprises ferromagnetic material.

25. The electronic device according to claim 21 wherein another one of the two or more modes of operation is a second programmable mode, in which a function operated by each one of the plurality of controls is configurable, and wherein the electronic device enters the second programmable mode when the at least one magnetic sensor detects a correctly aligned magnetic field.

26. The electronic device according to claim 21 wherein another one of the two or more modes of operation is a normal use mode, in which a function operated by each one of the plurality of controls is locked in a preselected configuration, and wherein the electronic device enters the normal use mode in the absence of a correctly aligned magnetic field being detected by the at least one magnetic sensor.

27. The electronic device according to claim 21 comprising wherein:
 the at least one magnetic sensor comprises:
  a first magnetic sensor in communication with the control unit; and
  a second magnetic sensor in communication with the control unit;
 the electronic device enters the programmable mode of operation upon receiving a signal from the first magnetic sensor; and
 the electronic device enters a normal use mode of operation, in which functions operated by the plurality of controls are locked in a preselected configuration, upon receiving a signal from the second magnetic sensor.

28. The electronic device according to claim 27 wherein the first magnetic sensor is configured and arranged to detect a magnetic field having a first polarity.

29. The electronic device according to claim 28 wherein the second magnetic sensor is configured and arranged to detect a magnetic field having a second polarity, the second polarity opposing the first polarity.

30. The electronic device according to claim 27 wherein the second magnetic sensor is configured to detect a magnetic field having a first polarity, and the second magnetic sensor is mounted in an opposing orientation to the first magnetic sensor such that the second magnetic sensor is responsive to a magnetic field having a polarity which is opposite to the polarity to which the first magnetic sensor is responsive.

* * * * *